March 27, 1928.
T. C. STEIMER
1,663,925
GLASS FEEDING MECHANISM
Original Filed Feb. 12, 1910
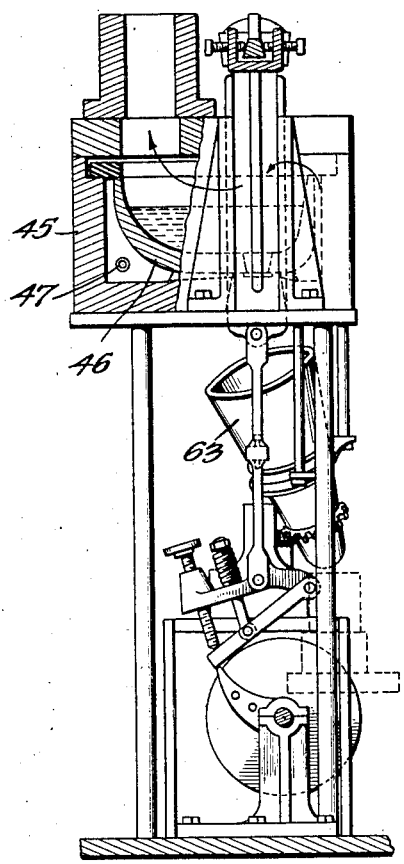
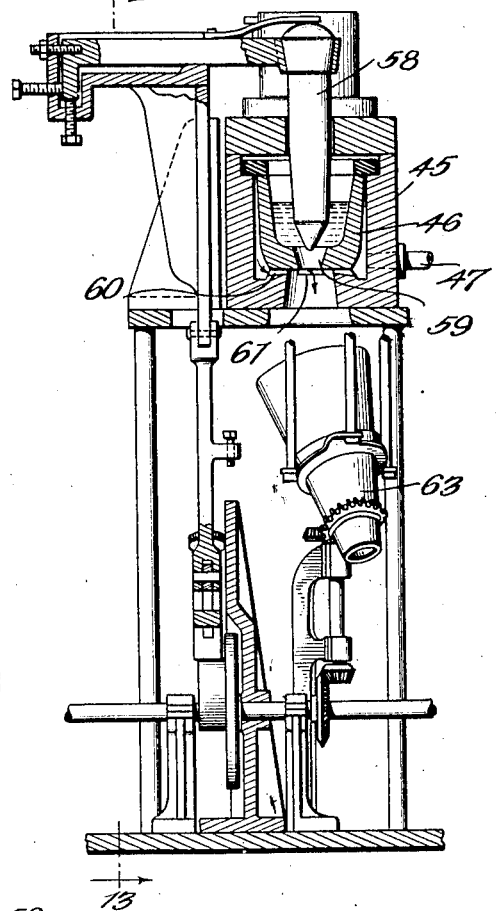
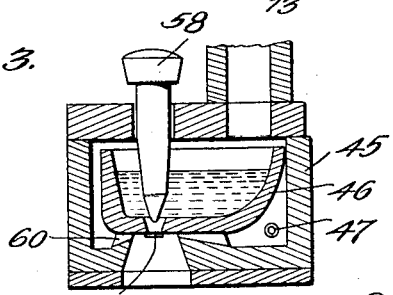
Inventor
CHARLES M. STEIMER,
EXECUTOR OF THEODORE C. STEIMER,
By
Attorney Patented Mar. 27, 1928.

1,663,925

UNITED STATES PATENT OFFICE.

THEODORE C. STEIMER, DECEASED, LATE OF PITTSBURGH, PENNSYLVANIA; BY CHARLES M. STEIMER, EXECUTOR, OF ZANESVILLE, OHIO, ASSIGNOR, BY MESNE ASSIGNMENTS, TO HARTFORD-EMPIRE COMPANY, OF HARTFORD, CONNECTICUT, A CORPORATION OF DELAWARE.

GLASS-FEEDING MECHANISM.

Original application filed February 12, 1910, Serial No. 543,582, and in Canada January 26, 1918. Divided and this application filed October 27, 1925. Serial No. 65,186.

The invention herein claimed relates to the art of feeding glass for the manufacture of pressed or blown articles, such as table ware and the like.

The invention to be covered by this application is a method of and apparatus for feeding glass through a downwardly discharging outlet from a parent body, the glass issuing from the outlet into a heated zone in which the glass as it issues from the outlet is accumulated prior to its delivery to the forming mechanism. This results in a heat treatment of the glass after its issuance through the orifice and prior to its reception in a mold, whereby not only is the formation of a cold skin retarded, but whereby irregularities in chilling during the issuance of the glass are prevented, and whereby the feeding of the glass in proper charges is facilitated.

Referring to the accompanying drawings in which corresponding parts are designated by similar marks of reference,—

Figure 1 is a diagrammatic side view partly in elevation and partly in section showing mechanism forming the subject-matter of this application and adapted to carry out the method herein claimed.

Figure 2 is a section and elevation of a different view of the same mechanism.

Figure 3 is a fragmental view partly in elevation and partly in section, showing the delivery of a charge of glass.

The chamber 45 encloses a pot 46 having the form shown in the drawing so that a gas flame introduced thereunder by a burner 47 reverberates around the pot 46, and at the same time assists the plunger in its function as hereinafter described. The plunger 58 is reciprocated automatically and periodically in the pot, which contains molten glass, and which has an orifice 59 in its bottom. Mechanism so reciprocating the plunger and by which the plunger is mounted, is shown in my original application aforesaid, but as the specific character of such mechanism forms no part of the invention here claimed, no detailed showing thereof is necessary.

The pot 46 is seated on an upwardly projecting boss 60 in the chamber 45 and this boss is provided with several radial slots 61 through which a fine flame constantly plays immediately under the outlet of the opening 59. The several jets of flame are inclined toward a common center and melt and cut off the charge of glass delivered by the rising and falling of the plunger 58, the level of the glass in the container being held constant by feeding glass thereto at the proper rate through suitable mechanism such as is described in my aforesaid application. This means that the head or pressure at the outlet is always the same, while the temperature conditions are also held constant, the weight of the charge delivered on each pulsation being determined by the motion of the plunger. The operation is as follows:—

The constant level of glass being maintained in the pot 46, the plunger 58, rising at the proper time, allows a flow through the outlet 59 and then stops the flow by constricting the passage. Meanwhile, the constantly playing flames in the slot 61 separate the mass of glass in a practically spherical form, so that it drops into the revolving cone 63 and thence into the mold M.

It will be noted that the flow of glass through the outlet is interrupted by partially obstructing the outlet, the glass being heated to a temperature at the point 61 so as to separate the mass in the pot 46 from the falling charge of glass very much as a drop of water is separated from the main body. That is, the charge carries with it in spherical form all of the glass separated off from the main body by the thin sheet of gas flame. The effect of this intense local heating is that the highly heated liquid glass will be forced by the flame either to follow the charge or to travel back to the opening 59, so that there is no tail or string of glass either hanging to the outlet or following the charge. The mechanism for actuating the plunger is so geared and arranged that the motions are exact and the amount of glass is exactly measured off to suit the molds being used.

What is claimed as the invention of THEODORE C. STEIMER is:—

1. A measuring and interrupting device, comprising a receptacle having an outlet, a stopper adapted to constrict the outlet, a flame under the outlet, and mechanism to automatically operate the stopper at predetermined times to a regulable degree.

2. In a device for intermittently delivering molten glass from a receptacle, an outlet for the glass, a reciprocating stopper therein, and gas jets for severing thread tending to form from the charge of glass delivered from the outlet.

3. The method of feeding molten glass, which consists in flowing the glass in a plastic condition suited to the shaping operations, accumulating the glass in a chamber lined with a hot gaseous envelope, and successively cutting off the accumulated charges.

4. A step in the delivery of glass to the mold of a forming machine, consisting of gathering from the stream of glass a gob of greater diameter than the stream itself, subjecting said gob to heat and severing and discharging said gob thus formed periodically into the mold of a forming machine.

5. The method of producing a mold charge of molten glass which consists in flowing the glass past an outlet, suspending it in a mass sufficient to form a mold charge beneath the outlet, subjecting the suspended mass to the action of a hot gaseous envelope, and detaching from the outlet the mass thus heated.

6. The method of feeding molten glass in mold charges which consists in periodically discharging molten glass through an outlet to form successively suspended masses, detaching a mold charge from each suspended mass, and directing burning gases against the remainder of each mass to cause it to move back into the outlet.

7. The combination with a receptacle for holding molten glass and a heating chamber, of means for conducting glass from the receptacle into the chamber and for temporarily suspending the issuing glass in the chamber until a suspended mold charge accumulates in the chamber.

8. In apparatus of the class described, the combination of the tank or other melting furnace, a receptacle for holding molten glass having a discharge orifice, mechanically operable controllable means aiding in suspending a mass of molten glass outside said receptacle, and means for heating said suspended mass.

9. The method of forming mold charges of glass from a parent body which consists in flowing glass from the parent body through an orifice whose upper end is submerged in the parent body and whose lower end is heated from below until glass has been accumulated in a mold charge suspended below the lower heated end of the orifice, and separating the depending mass in the form of a mold charge.

10. The hereinafter described method of forming mold charges of glass which consists in feeding glass from a reservoir holding glass for a plurality of charges through an orifice in the bottom of the reservoir, supporting each mold charge beneath the orifice, separating such mold charge from the mass in the orifice prior to the reception of the mold charge in a receptacle, and preventing the glass in the orifice from descending by heated gases below the orifice.

11. Apparatus for delivering viscous glass from a furnace comprising a spout with a downwardly directed delivery orifice in the bottom thereof, means for applying a temperature modifying medium within said spout, and means for applying burning gases to the exterior of the orifice of said spout.

12. In a glass feeder, the combination with a receptacle having a discharge outlet having its upper end submerged in molten glass, and having its lower end directed downwardly, a movable implement to intermit the issue of glass through the outlet, mechanism to automatically and periodically operate the implement to a regulable degree, and means beneath the outlet to heat the same and the glass pendant therefrom.

13. The process of delivering mold charges of molten glass from an outlet which consists in periodically discharging the glass through the outlet, controlling the discharge by acting on the glass above the outlet to accumulate successive masses of molten glass suspended beneath the outlet, detaching each mass as formed from the outlet, and directing gaseous fluid against the glass remaining below the outlet to cause said glass to move back into the outlet after each discharge and prior to the following discharge of glass.

CHARLES M. STEIMER,
*Executor of Theodore C. Steimer, Deceased.*